(12) United States Patent
Miller et al.

(10) Patent No.: US 7,518,060 B1
(45) Date of Patent: Apr. 14, 2009

(54) PREFABRICATED STRUCTURAL MEMBER HAVING A WIRE ROUTING SYSTEM

(75) Inventors: Jeffery V. Miller, Toledo, OH (US);
John L. Sigmund, Holland, OH (US);
Jacob J. Huskins, Toledo, OH (US);
Robert Douglas Spaans, Perrysburg, OH (US)

(73) Assignee: Comfort Line, Ltd., Toledo, OH (US)

( * ) Notice: Subject to any disclaimer, the term of this patent is extended or adjusted under 35 U.S.C. 154(b) by 0 days.

(21) Appl. No.: 11/809,192

(22) Filed: May 31, 2007

(51) Int. Cl.
*H01H 9/02* (2006.01)
(52) U.S. Cl. .......................... 174/58; 174/53; 174/480; 174/68.1; 174/60; 174/64; 220/2.3; 248/906; 52/220.3
(58) Field of Classification Search ............... 174/53, 174/58, 50, 63, 64, 54, 60, 61, 480, 481, 174/21 R, 19, 135; 52/220.5, 220.1, 220.7, 52/220.3, 220.2, 275, 421, 431; 248/906; 439/535; 220/2.2, 2.3
See application file for complete search history.

(56) References Cited

U.S. PATENT DOCUMENTS

| | | | |
|---|---|---|---|
| 3,767,151 A * | 10/1973 | Seal et al. ............... 248/205.1 |
| 4,074,489 A | 2/1978 | Eckel |
| 4,078,348 A | 3/1978 | Rothman |
| 4,354,052 A | 10/1982 | Albany et al. |
| 4,557,091 A | 12/1985 | Auer |
| 5,007,222 A | 4/1991 | Raymond |
| 5,298,681 A | 3/1994 | Swift et al. |
| 5,560,155 A | 10/1996 | Back |
| 5,685,113 A | 11/1997 | Reuter et al. |
| 5,784,841 A | 7/1998 | Nowell |
| 6,003,279 A | 12/1999 | Schneider |
| 6,189,269 B1 | 2/2001 | De Zen |
| 6,197,412 B1 | 3/2001 | Jambois |
| 6,314,704 B1 | 11/2001 | Bryant |

(Continued)

OTHER PUBLICATIONS

Genova Products, Inc., Vinyl Wire Management, product packaging—Elbow Part No. WM210, at least as early as 2007, Davison, MI.

(Continued)

*Primary Examiner*—Dhiru R Patel
(74) *Attorney, Agent, or Firm*—MacMillan, Sobanski & Todd, LLC

(57) ABSTRACT

A wire distribution system comprises a support structure having a first wall terminating in a first flange and a second wall terminating in a second flange. The second flange may be spaced apart from the first flange and provide a web section formed therebetween. The web section has an outer surface and an inner surface, wherein the outer surface defines an abutment to a mating structure, such as a wall, door, or window. The inner surface further defines a part of an inner cavity, and further includes a conduit channel formed therein. The conduit channel has an at least one wall section extending into the inner cavity and further includes an open leg facing the mating structure. An aperture is formed in the support structure first side and is oriented substantially adjacent to the conduit channel. A receptacle extends into the aperture and defines an interior space. The receptacle includes at least one conductor aperture that is aligned with the conduit channel open leg such that the conduit channel open leg communicates with receptacle interior space.

16 Claims, 5 Drawing Sheets

U.S. PATENT DOCUMENTS

| | | |
|---|---|---|
| 6,342,675 B1 | 1/2002 | DeBartolo, Jr. et al. |
| 6,694,700 B1 | 2/2004 | Mackett |
| 7,127,865 B2 | 10/2006 | Douglas |
| 2006/0254167 A1 | 11/2006 | Antonic |

OTHER PUBLICATIONS

Genova Products, Inc., Vinyl Wire Management, product packaging—Wire Channel Part No. WM300, at least as early as 2007, Davison, MI.

* cited by examiner

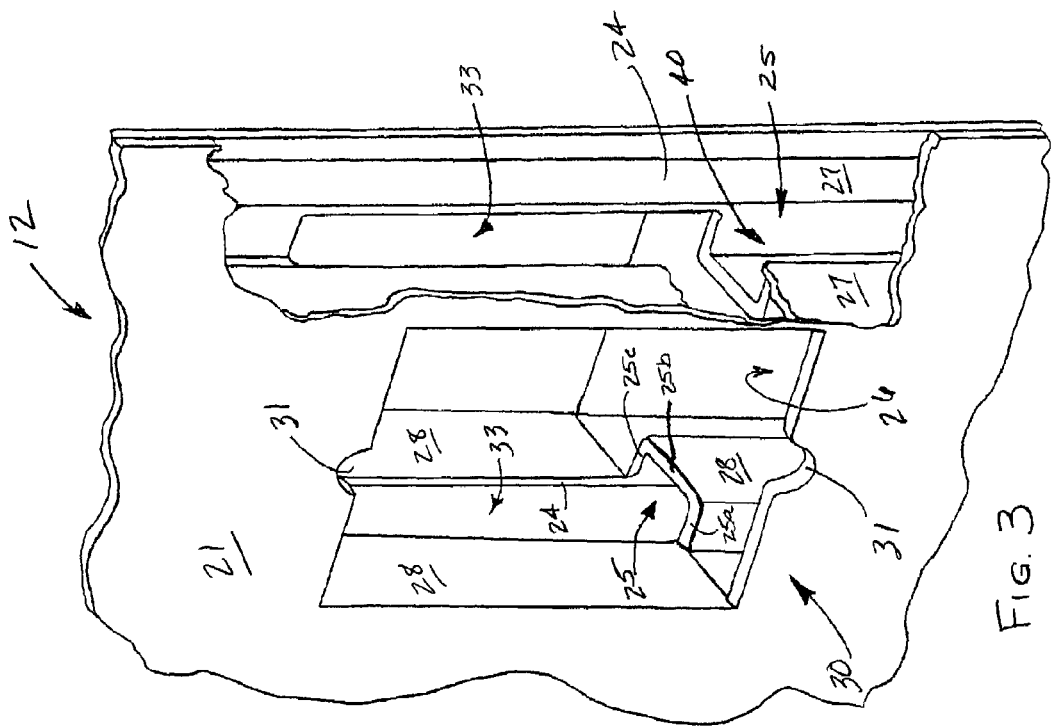
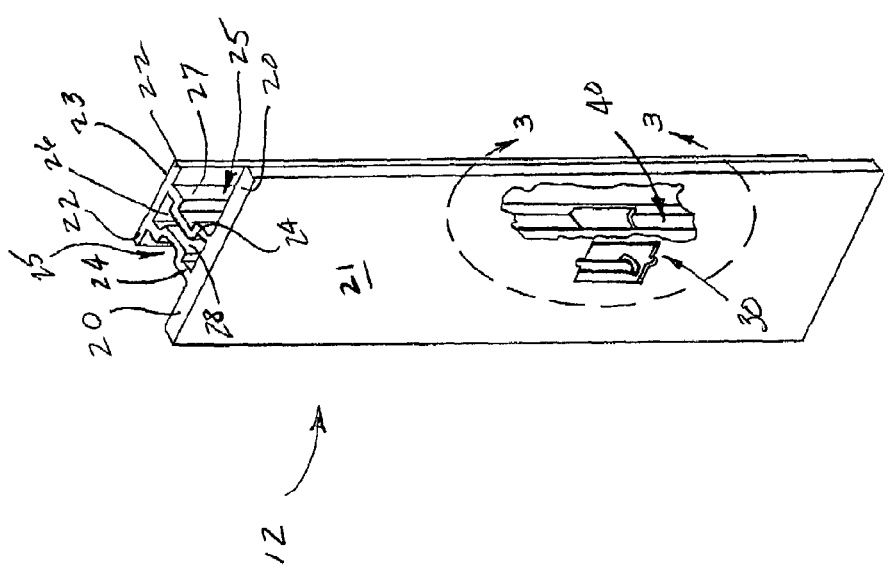

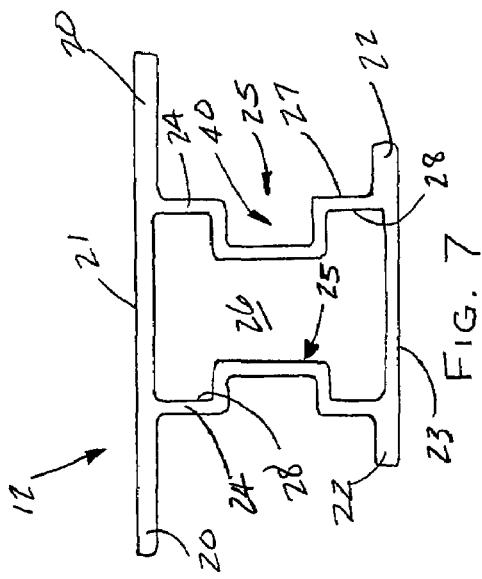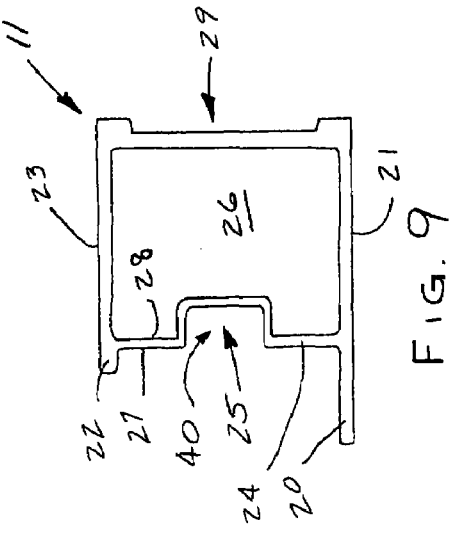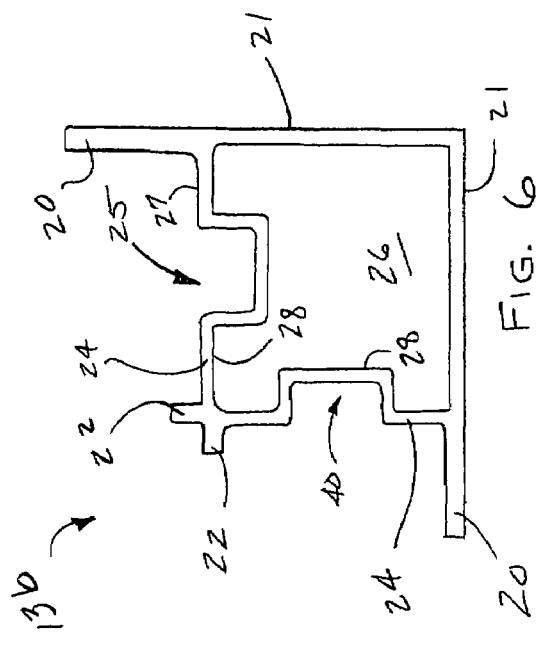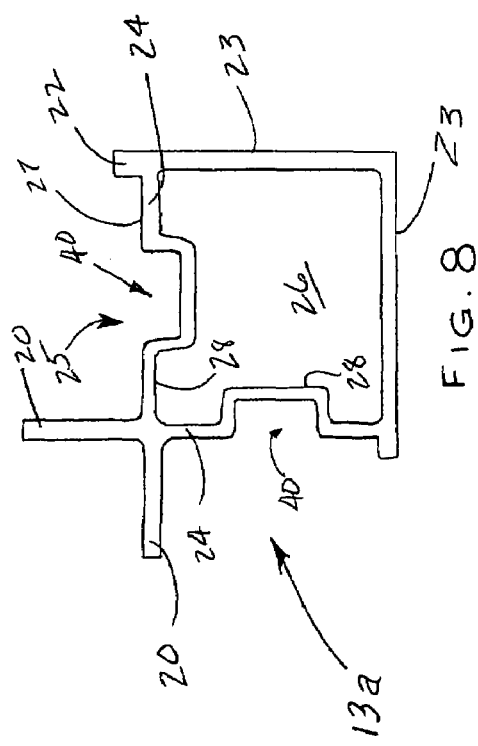

PREFABRICATED STRUCTURAL MEMBER HAVING A WIRE ROUTING SYSTEM

BACKGROUND OF THE INVENTION

This invention relates in general to a wiring distribution and termination system for accommodating electrical wiring. In particular, this invention relates to an electrical distribution system for a sunroom or patio enclosure including an integrally-formed channel section and a cooperating electrical outlet structure. The channel section is formed as part of a pultruded, fiberglass-reinforced, structural support member. A cooperating electrical outlet structure is inset into the structural support and communicates with the channel in order to route concealed electrical wires.

Creating enclosed living spaces with prefabricated structural elements, especially sunrooms or patio enclosures with vast expanses of glass or windows, has been popular for some time. As these structures have evolved, conveniences have been added to help integrate these spaces into the rest of the house to which they are attached. Many of these conveniences require electrical power to operate, therefore creating a need for wiring distribution systems. Over time, the structures have grown in size and stature which has further necessitated similar refinements in the wiring distribution system.

Conduit structures for conveying electrical wires within a prefabricated wall or other structural element are known in the art. These conduits provide an encapsulated environment for concealing and protecting electrical wiring from damage and unintended electrical contact while creating a more aesthetically pleasing appearance. Many conventional conduits are closed elements, disposed within the interior of or on the surface of a supporting structure, such as a prefabricated wall section, post, or stanchion. Other electrical routing structures take the form of a closed, longitudinal cavity within the prefabricated wall, post, or stanchion. These longitudinal interior wall cavities may further include a covering member that partitions a smaller portion of the interior cavity for wire location. The partitions further isolate the wire from other filler materials that may be disposed within the interior wall cavity, such as foam insulation or concrete.

Whether the closed conduit structure is a separate element or integral within the supporting structure, these electrical distribution systems require wiring to be routed from an open end of the conduit to an outlet receptacle structure, commonly referred to as a junction box or "J" box. This routing of wiring may be accomplished by inserting the wire into the conduit sections prior to assembly. The wiring and conduit sections may be then assembled and mounted onto or within the wall structure. Typically, the conduit structure is a closed internal wall cavity or an assembled conduit structure. In these situations, the wire must usually be moved or "fished" into position from the wall cavity or conduit open end through to the receptacle outlet.

If the cavity or conduit is not straight or smooth enough to freely pass the wire or cable, a long, thin and flexible device, called a fish tape, must be inserted through the cavity from the receptacle end through to and out the conduit open end. The wire, cable, or a pull-string is then attached to the fish tape and pulled back through the conduit or interior wall cavity and out of the receptacle box. Since the cavity is enclosed, the fish tape must be inserted blindly and articulated in order to pass though the cavity and out the open end. The use of a fish tape is both difficult and time consuming and would be desirable to eliminate. Furthermore, fishing a wire through a hollow wall section generally requires a straight opening that occupies significant space, which may be unavailable in many structural designs.

Thus, it would be desirable to provide an electrical passageway in a preformed structural section that eliminates the difficulties associated with passing a wire through a structural member to a terminating receptacle. It would further be desirable to provide a wiring system having a flush-mounted and concealed appearance that can be integrated into a sunroom or patio enclosure structure.

SUMMARY OF THE INVENTION

This invention relates to a wiring distribution and termination system for accommodating electrical wiring in a prefabricated, composite support structure. This invention includes a pultruded, reinforced structural support having a formed channel structure that is integral with a portion of the support, the structural support being further adapted to receive a wall section, door, or window element. The channel structure includes a longitudinal open leg for receiving at least one of an electrical wire and a cable. The structural support may further include an aperture for receiving a receptacle structure, preferably in a substantially flush mounted arrangement. The aperture further may provide a cooperating junction between the channel structure and the receptacle.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a perspective view, in partial cross section of a support structure having an aperture and a conduit channel in accordance with the invention.

FIG. 3 is an enlarged, perspective view of the support structure, aperture, and conduit channel of FIG. 2 in accordance with the invention.

FIG. 6 is a cross sectional view of an alternative embodiment of a corner support structure in accordance with the invention.

FIG. 7 is a cross sectional view of an alternative embodiment of a junction support structure in accordance with the invention.

FIG. 8 is a cross sectional view of an alternative embodiment of a corner support structure in accordance with the invention.

FIG. 9 is a cross sectional view of an alternative embodiment of a terminating support structure in accordance with the invention.

DETAILED DESCRIPTION OF THE INVENTION

Figure 1:
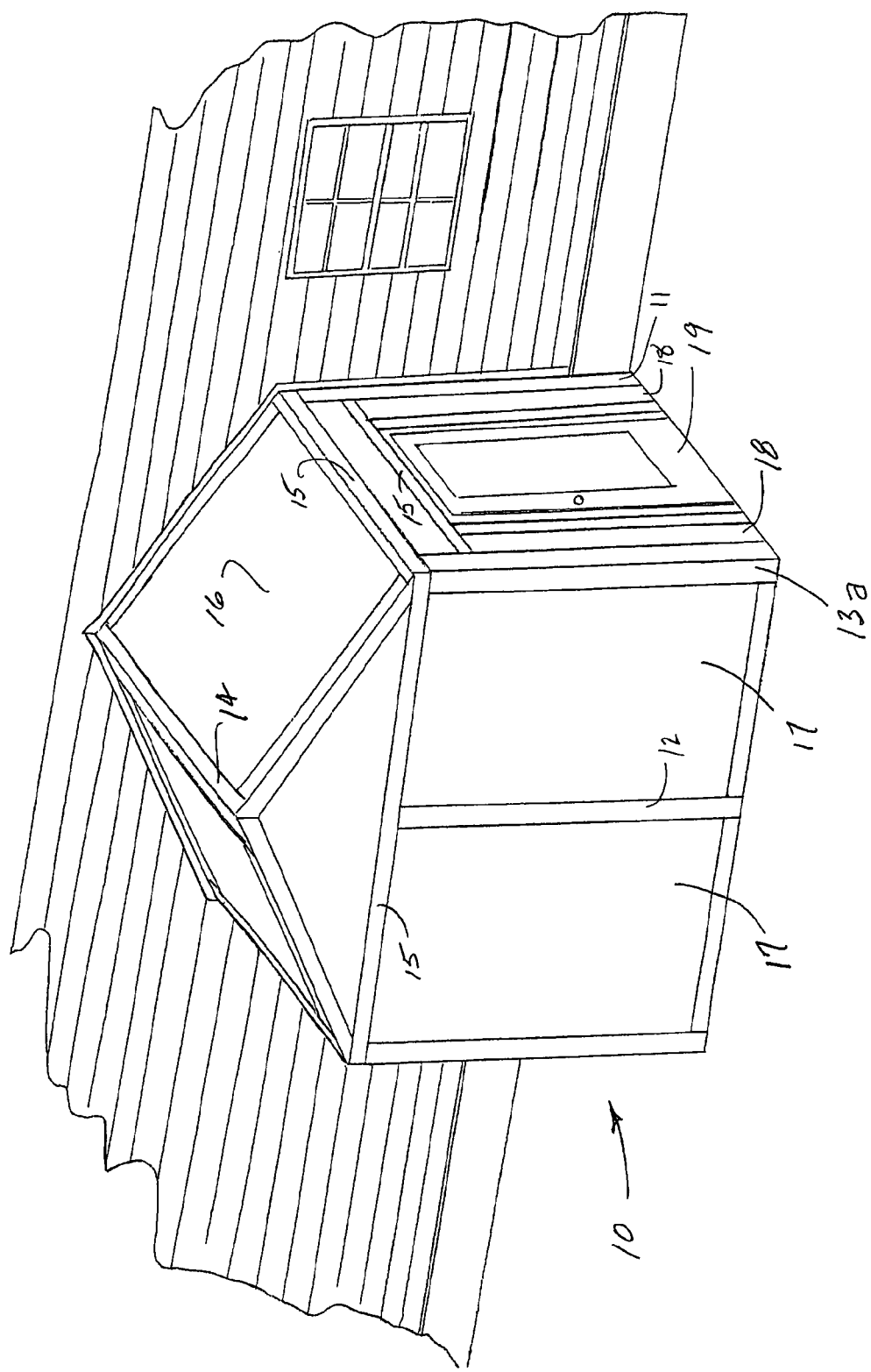
FIG. 1 is a perspective view of a sunroom or patio enclosure in accordance with the invention.

Referring now to the drawings, there is illustrated in FIG. 1a sunroom or patio enclosure structure, indicated generally at 10, in accordance with the invention. The sunroom 10 includes various structural support members that may include, but are not limited to, an end support 11, a junction support 12, an outside corner support 13*a*, an inside corner support 13*b* (FIG. 6), a ridge beam 14, and a header beam 15. FIGS. 6-9 illustrate examples of general cross sectional views of these various structural support member configurations. Generally, the structural support members provide a load bearing function that supports typical structural loads and resists environmental forces. Though the structural support members may be illustrated and described as having features with specific relative orientations and dimensional characteristics, these features, orientations, and dimensions are for exemplary purposes only and are not intended to limit the invention in any way. Where possible, like features are indicated with the same number designations for clarity and consistency. The support members depicted in FIGS. 6-9 may be other than illustrated if so desired and remain within the scope of the invention.

The sunroom 10 of FIG. 1 may further include various panels, openings, and wall sections that are attached to the structural support members, though such is not required. The various panels may include a roof panel 16, a glass panel 17, a wall section 18, and a door 19. The roof panel 16 and the wall section 18 may be opaque structures that are formed, for example, as extruded plastic elements or pultruded, fiber reinforced elements. The roof panel 16 and the wall section 18 may further include an interior core material, such as structural or insulating foam. The wall section 18 may further include a conventional window (not shown), if so desired. Alternatively, the roof panel 16 and the wall section 18 may be translucent, having one or more glass panels. The glass panels may be fixed or may articulate to an open position, if so desired.

The various panels, openings, and wall sections are mated with appropriate structural support members to form an exterior portion of the sunroom 10, shown in FIG. 1. It will be appreciated that the structural support members and the various panels may also be used to construct interior load bearing walls and partitions in order to provide a segmented enclosure having multiple rooms. As shown in FIG. 1, the junction support 12 may be provided to connect two elements, such as for example the glass panel sections 17, in a substantially collinear orientation. The structural support members may also be configured to orient one or more elements in a relative arrangement to other structural support members and to other structure elements. For example, the end support 11 may be configured to attach the wall section 18 to a main structure, such as an existing house.

Figure 5:
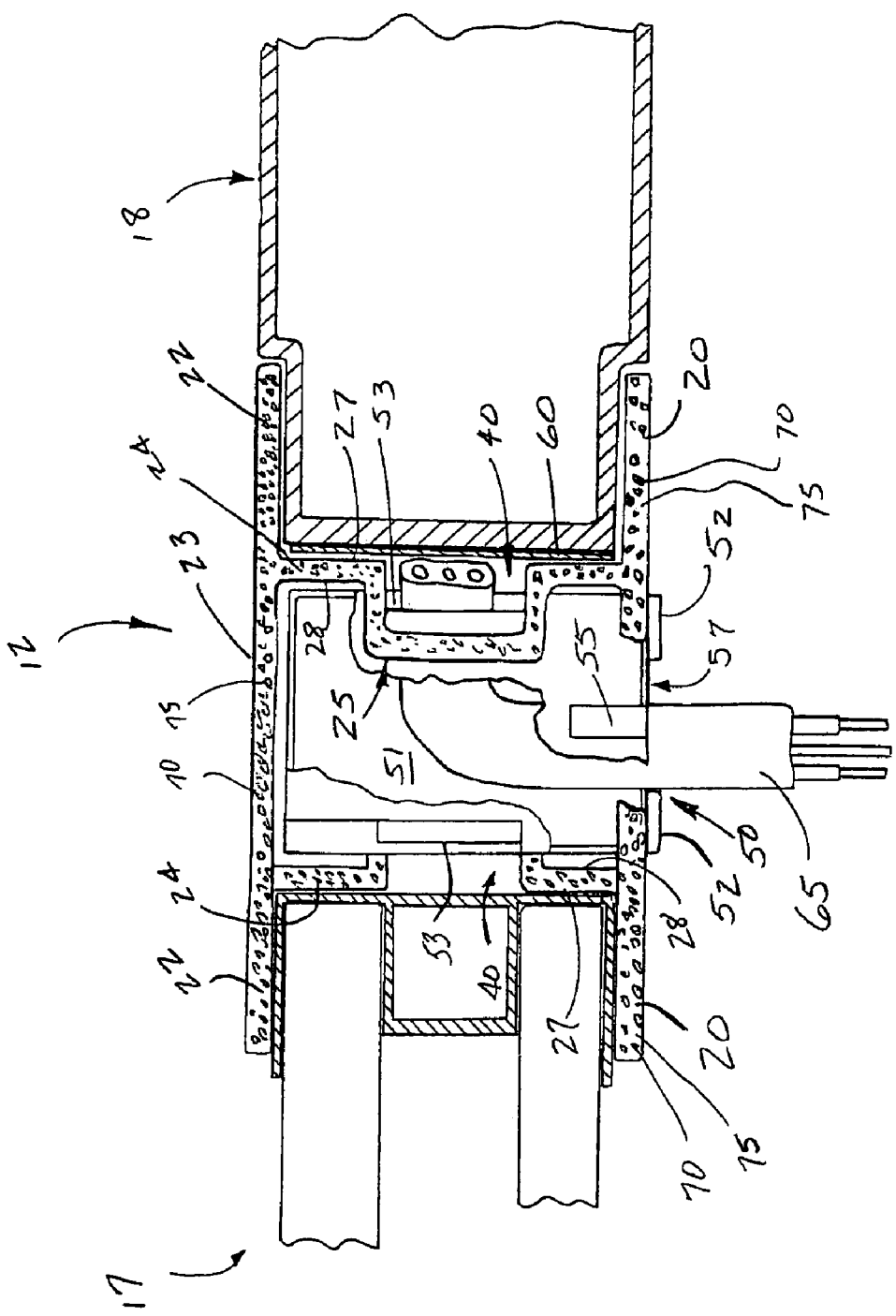
FIG. 5 is a cross sectional view of an alternative support structure including a conduit channel in accordance with this invention.

FIGS. 2 and 3 illustrate the junction support 12. The construction, quantities, and relative orientations of the various structural support member features will be described in the context of the junction support 12. One of ordinary skill in the art will appreciate that such structural support member features are generally applicable to each structural support member depicted herein and may include a different quantity and relative orientation of such structural support member features. Such differences in structural support member construction are within the scope of the invention. The junction support 12 generally includes the structural support member features of a first wall 21 terminating in a pair of first flanges 20, a second wall 23 terminating in a pair of second flanges 22, and a web 24 integrally disposed between each of the first and second flanges 20 and 22. A cross sectional view of the junction support 12 is also shown in FIG. 7. The first flanges 20 of the junction support 12 are illustrated in FIGS. 2 and 7 as having a longer projection length than the second flanges 22, though such is not required. Alternatively, the first and second flanges 20 and 22 may be of equal length. FIG. 5 illustrates the junction support 12 mated with the wall section 18 and the glass panel 17 and having the first and second flanges 20 and 22 of equal length. Similarly, any of the support members shown in FIGS. 6-9 may be configured to have flanges of equal length.

Referring to FIGS. 2-5, the web 24 of the junction support 12 includes an outer surface 27 and an inner surface 28. The outer surface 27 defines an abutment wherein the wall section 18 may locate and mount, as best shown in FIG. 5. The inner surface 28 defines a portion of an inner cavity 26. The inner cavity 26 may be further partially defined by a plurality of inner surfaces 28, as best shown in FIGS. 6-8. Alternatively, the inner cavity 26 shown in FIG. 9 may be partially defined by the web 24 and an end cap section, shown generally at 29. The inner cavities 26 of the structural support members shown in FIGS. 6-9 may be hollow or filled with a material if so desired.

Referring to FIGS. 2 and 3, the web 24 further includes an integrally-formed conduit channel, indicated generally at 25. In an embodiment of the invention shown in FIG. 3, the conduit channel 25 may be formed as a plurality of integral, relatively angled, wall sections 25*a*, 25*b*, and 25*c* that extend into the inner cavity 26. The relatively angled wall sections 25*a*, 25*b*, 25*c* are shown in FIG. 3 as being oriented in a substantially perpendicular arrangement to adjacent sections, though such is not required. Alternatively, the conduit channel 25 may be a single wall section having a generally arcuate shape (not shown). The conduit channel 25 defines a channel open leg, indicated generally at 40, that provides for the routing of an electrical wire, cable or other such elements. The conduit channel 25 is oriented such that the channel open leg 40 faces the mating wall section 18, best shown in FIG. 5. The conduit channel 25 may be centrally positioned on the web 24, equidistant from the first and second walls 21 and 23, if so desired.

Figure 4:
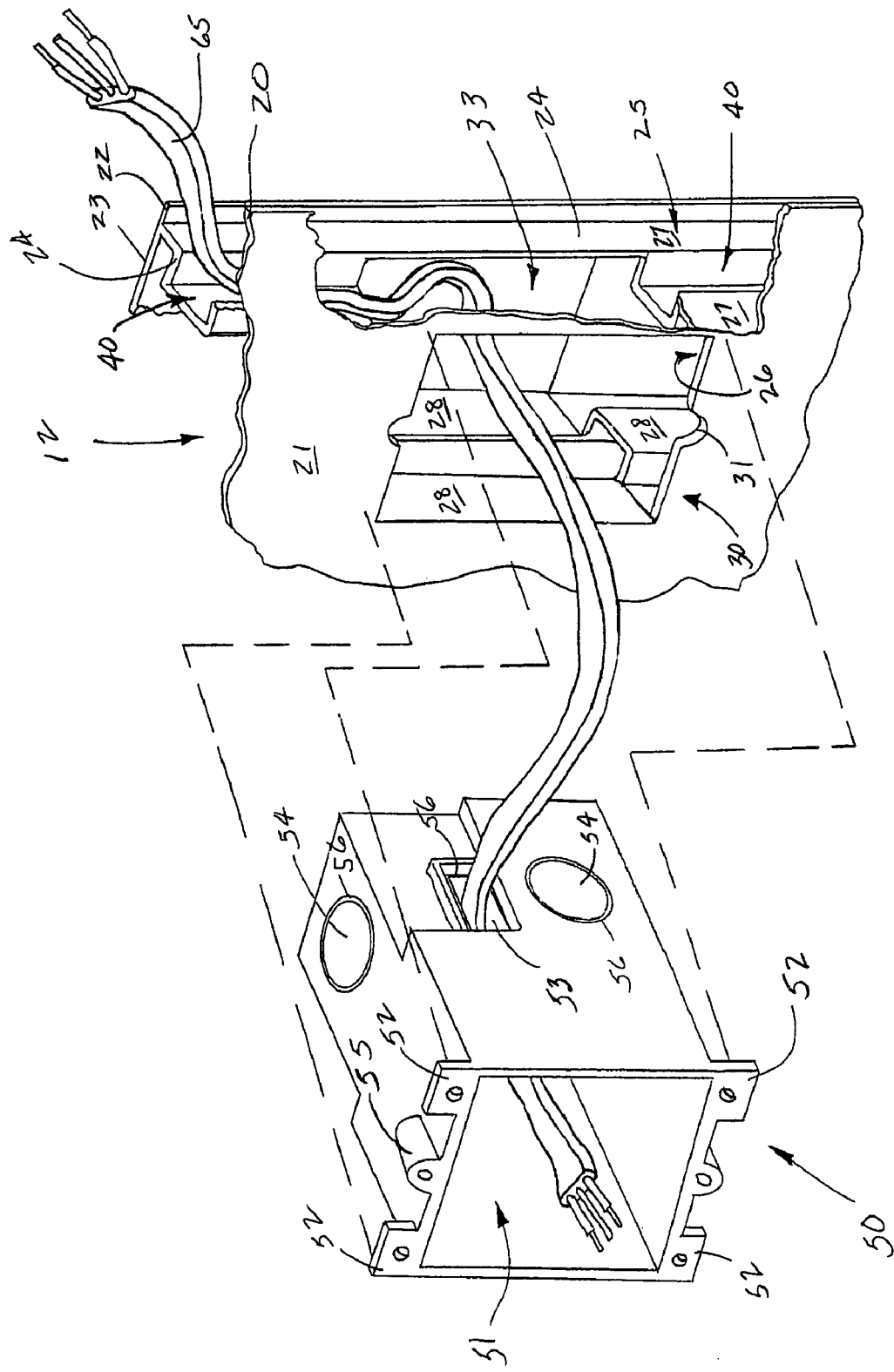
FIG. 4 is an exploded, perspective view of a receptacle box and the support structure of FIG. 3 in accordance with the invention.

As shown in FIGS. 2-4, the junction support 12 includes an aperture, indicated generally at 30. The aperture 30 provides an accessible intersection with the conduit channel 25 and the channel open leg 40. A receptacle, indicated generally at 50 in FIGS. 4 and 5, inserts into the aperture 30 and is oriented for communication with the conduit channel 25 and the channel open leg 40. The aperture 30 may be cut, stamped, punched, sawed, routed or otherwise formed into a wall of the junction support 12. FIG. 3 shows the aperture 30 formed into the first wall 21 which may be oriented toward an interior area of the sunroom 10. Alternatively, the aperture 30 may be formed into the second wall 23 in order to provide electrical access to an exterior area of the sunroom 10. Furthermore, the first and second walls 21 and 23 of the junction support 12 may be oriented other than described, if so desired, and remain within the scope of the invention.

The aperture 30 includes a profile sufficient to allow the receptacle 50 to be inserted into the aperture 30 and locate in a substantially flush or low profile orientation to the first wall 21. Such a profile may include a relief section 31 to provide clearance for receiving a fixture mounting boss 55 of the receptacle 50, is so desired. The fixture mounting boss 55 provides an attachment point for an electrical outlet (not shown), a switch (not shown), coaxial cable outlet (not shown), or other terminal structure. The aperture 30 also extends into the conduit channel 25 to create a conduit window 33. As shown in FIG. 4, the conduit window 33 provides an access pathway for a wire or wiring 65 to pass from the channel open leg 40 through to an interior space, indicated generally at 51, of the receptacle 50.

FIG. 4 illustrates a plurality of conductor apertures 53, 54 formed as part of the receptacle 50. The conductor apertures 53, 54 provide a passageway for the wiring 65 or other element to pass through to the interior space 51 of the receptacle 50. The conductor apertures 53, 54 are illustrated as round or rectangular, though such is not required. The conductor apertures 53, 54 may be of any size, shape, orientation, or configuration that allows access to the interior space 51. The receptacle 50 may further be provided with integrally formed knock-out plugs as part of the conductor apertures 53, 54. The knock-out plugs may be provided with a boundary portion 56 that includes a selectively pre-cut or thinned material section around the perimeter of the knock-out. The receptacle 50 further includes at least one mounting tab 52 that provides an attachment point to secure the receptacle 50 to the junction support 12. The mounting tabs 52 may be secured by any appropriate devices, such as for example screws, nails, rivets, barbed fasteners, and the like. The mounting tabs 52 may further locate the conductor apertures 53, 54 relative to the channel window 33 and the channel open leg 40. FIG. 5 illustrates the receptacle 50 mounted within the junction support 12. The receptacle 50 may include a boss recess 57 that provides a clearance for attaching electrical outlets, switches, or other terminal structures in a reduced profile configuration.

FIG. 5 shows a cross sectional view of the junction support 12 in accordance with an embodiment of the invention. The junction support 12, and the support members of FIGS. 6-9 generally, may be made of any material including metal, such as aluminum or steel, or plastics and composites. The junction support 12, as shown in FIG. 5, is manufactured of a composite material such as a longitudinal, fiber reinforced, resin matrix structure. The junction support 12 includes a plurality of reinforcing fibers 70 dispersed throughout a resin matrix 75. The reinforcing fibers 70 may be fiberglass of any variety, such as for example e-glass or s-glass. Alternatively, the reinforcing fibers 70 may be carbon fibers, aramid fibers, or a combination of fiberglass, carbon fiber, and/or aramid fibers. The reinforcing fibers 70 may be continuous individual filaments, rovings or bundles, woven mat, or resin-impregnated mat, commonly referred to as prepreg.

The resin matrix 75 may be of a thermoset variety that generally exhibits one solidification step, known as cross-linking, and may generally not be reheated and subsequently reformed. Examples of such thermoset resins are epoxies, certain polyesters, phenolic resins, and the like. The resin matrix 75 may alternatively be a thermoplastic resin wherein the resin group may be reheated and subsequently reformed into an altered shape. Examples of such thermoplastic resins are vinyl esters, acrylonitrile butadiene styrene (ABS), polyvinyl chloride (PVC) and the like. Additionally, the resin material may include a chopped fiber reinforcement or no reinforcement, if so desired.

The junction support 12, and any of the support structures shown in FIGS. 6-9, may be produced by any suitable manufacturing process, such as for example extrusion or pultrusion which are known in the art. Pultrusion, which is closely related to extrusion processing, provides a continuous, axially directed product flow using a series of orienting dies, forming dies, heating and curing dies, and a conveyance mechanism to produce longitudinally symmetrical shapes. In pultrusion, the conveyance mechanism is typically a pull-block or a conveyor system that engages the surface of the composite structure and pulls the cured or partially cured structure from the curing die. A pre-forming die is provided to orient any necessary fiber reinforcements, surfacing veil materials, woven and other mat structures, and any off-axis fibers or plies into the opening of the pultrusion dies. The oriented composite constituents then pass through a resin bath, resin injection head, or similar resin application structure where the resin matrix material is applied to the composite constituents. The fiber and resin mix is then pulled into a squeeze-out die which eliminates excess resin material and establishes the proper fiber volume fraction suitable for the composite structure. The composite structure then passes into a heated die in order to solidify and cure the resin matrix. The composite structures are subsequently cut to the desired length to produce the junction support 12, along with the other structural support members shown in FIG. 1. The structural support members may be further machined, as described above, to form the aperture 30 therein.

As the sunroom 10 of FIG. 1 is assembled and erected, the junction support 12, for example, may be located and secured in position by way of various coupling structures (not shown). The coupling structures have a portion that engages a corresponding portion of the interior cavity 26 of the junction support 12. The coupling structure may then be attached to the header beam 15, for example, or other mating structural support member or members. The coupling structures may attach the mating structural support members, such as for example junction section 12 to header beam 15 as shown in FIG. 1, in a substantially perpendicular arrangement. The coupling structures may alternatively be arranged in any other angular orientation that is so desired. The coupling structures may further be provided with such apertures, relief sections, or cut-outs so as to provide a continuous or substantially unrestricted access to the conduit channel 25 and the channel open leg 40.

Portions of the sunroom 10 are mated together during the assembly process, such as the junction support 12, the glass panel 17, and the wall section 18 shown in FIG. 5. The wall section 18 may be provided with a tongue-in-groove structure for location relative to the first and second flanges 21, 22 of the junction support 12, though such is not required. The wall section 18 may be joined to the junction support 12 by any securing fasteners or operations, such as for example screws, bolts, rivets, nails, adhesives, chemical welding, ultrasonic welding, heat joining, and the like. During construction of the sunroom 10, the wiring 65 may be disposed in the channel open leg 40 as shown in FIGS. 4 and 5. A barrier element 60, shown in FIG. 5, may be placed against the outer surface 27 of the web 24 to hold the wiring 65 in place during assembly and may provide additional protection against damage. The barrier element 60 may alternatively be an enclosed conduit structure (not shown) or c-clip arrangement (not shown) if so desired. The c-clip type arrangement may be selectively secured to the conduit channel 25 at desired intervals to assist in containing the wiring 65 within the conduit channel 25 during construction. The barrier element 60 or other retaining structure may be adhesively bonded to portions of the outer surface 27, provided with a snap fit engagement within the conduit channel 25, or merely positioned onto the outer surface 27.

FIGS. 6-9 show general cross sectional profiles of the end support 11, the junction support 12, the outside corner support 13a, and the inside corner support 13b. The support members of FIGS. 6-9 may be combined with other elements (not shown) or members (not shown) to create alternative structural support members, such as for example the ridge beam 14 of FIG. 1. The ridge beam 14 may be constructed as a singular member, as shown in FIG. 1, or may be an assemblage of select support members shown in FIGS. 6-9. For example, the ridge beam 14 may include one junction support member 12 that is coupled with another structural member (not shown) to orient a roof panel 16 at the proper pitch angle. The ridge beam 14 may alternatively be constructed, for example, as two end supports 9 connected by a pitch orienting member (not shown). The ridge beam 14, the junction support 12, or the end supports 9 may provide a wire distribution system similar to that described above. The wire distribution system could be oriented to support a ceiling mounted device, such as a hanging lamp (not shown) or ceiling fan (not shown). Such a wire distribution system is applicable to other structural support members that may be oriented in any attitude not limited to a vertical or a horizontal plane.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wire distribution system comprising:
   a support structure having a first wall terminating in a first flange and a second wall terminating in a second flange, the second flange being spaced apart from the first flange and having a web section extending therebetween, the web section having an outer surface and an inner surface, the outer surface being an abutment to a mating structure, the inner surface defining a part of an inner cavity, the web section having a conduit channel formed therein, the conduit channel facing the mating structure, the support structure having an aperture adjacent to the conduit channel; and
   a receptacle extending into the aperture, the receptacle having an interior space, the receptacle further having at least one conductor aperture adjacent to the conduit channel to provide a passageway from the conduit channel to the receptacle interior space.

2. The wire distribution system of claim 1 wherein the support structure is a fiber reinforced and thermoset resin composite support structure.

3. The wire distribution system of claim 2 wherein the support structure is a pultruded composite support structure.

4. The wire distribution system of claim 1 wherein the support structure first wall defines an interior surface of a room and the support structure second wall defines an exterior surface of the room.

5. The wire distribution system of claim 1 wherein the mating structure is a wall section.

6. The wire distribution system of claim 5 wherein the wall section is an opaque wall section.

7. The wire distribution system of claim 5 wherein the wall section is a translucent wall section.

8. The wire distribution system of claim 1 wherein the mating structure is a window.

9. The wire distribution system of claim 1 wherein the mating structure is a door.

10. The wire distribution system of claim 1 wherein a barrier element is disposed between the web section outer surface and the mating structure.

11. The wire distribution system of claim 1 wherein the mating structure is a roof panel.

12. The wire distribution system of claim 1 wherein the at least one wall section of the conduit channel is a plurality of wall sections.

13. The wire distribution system of claim 1 wherein the support structure first flange has a length that is longer than the support structure second flange.

14. The wire distribution system of claim 1 wherein the conductor aperture is a knock-out area positioned in a portion of the receptacle.

15. The wire distribution system of claim 14 wherein the knock-out is a co-formed plug, the co-formed plug having a boundary portion defining a break point for separating the co-formed plug from the receptacle.

16. The wire distribution system of claim 15 wherein the receptacle is constructed of a polymer material.

* * * * *